(12) United States Patent
Bienert et al.

(10) Patent No.: US 9,805,045 B2
(45) Date of Patent: Oct. 31, 2017

(54) METHOD AND SYSTEM FOR COMPRESSING DATA RECORDS AND FOR PROCESSING COMPRESSED DATA RECORDS

(75) Inventors: Jorg Bienert, Hurth (DE); Michael Hummel, Rosrath (DE); Norbert Heusser, Bonn (DE)

(73) Assignee: PARSTREAM GMBH, Cologne (DE)

( * ) Notice: Subject to any disclaimer, the term of this patent is extended or adjusted under 35 U.S.C. 154(b) by 1327 days.

(21) Appl. No.: 13/576,082

(22) PCT Filed: Feb. 4, 2011

(86) PCT No.: PCT/EP2011/000519
§ 371 (c)(1),
(2), (4) Date: Sep. 17, 2012

(87) PCT Pub. No.: WO2011/095345
PCT Pub. Date: Aug. 11, 2011

(65) Prior Publication Data
US 2013/0204850 A1    Aug. 8, 2013

(30) Foreign Application Priority Data
Feb. 4, 2010   (DE) .................. 10 2010 006 931

(51) Int. Cl.
G06F 17/30         (2006.01)
(52) U.S. Cl.
CPC .. *G06F 17/30153* (2013.01); *G06F 17/30324* (2013.01)
(58) Field of Classification Search
CPC .................. G06F 17/30153; G06F 17/30324
See application file for complete search history.

(56) References Cited

U.S. PATENT DOCUMENTS 5,907,297 A    5/1999  Cohen et al.
2002/0067506 A1  6/2002  Ryu
(Continued)

FOREIGN PATENT DOCUMENTS

EP    0633537 A2    1/1995
EP    1122655 A1    8/2001
(Continued)

OTHER PUBLICATIONS

International Search Report and Written Opinion for International Application No. PCT/EP2011/000519 Filed on Apr. 2, 2011.
(Continued)

*Primary Examiner* — Syling Yen
*Assistant Examiner* — Navneet Gmahl
(74) *Attorney, Agent, or Firm* — Hickman Palermo Becker Bingham LLP

(57) ABSTRACT

System and method to compress data records by providing data records with a binary structure; dividing the data records into several bit vectors; reducing the size of each bit vector by dividing the bit vector into consecutive partial areas of equal size, each partial area consisting of n bits, classifying the partial areas as trivial partial areas, quasi-trivial partial areas and non-trivial partial areas, combining one non-trivial or several consecutive non-trivial partial areas into one so named R block, and removing the trivial partial areas; as well as combining one quasi-trivial or several consecutive quasi-trivial partial areas into one so named O block.

23 Claims, 4 Drawing Sheets

(56) References Cited

U.S. PATENT DOCUMENTS

| | | | | |
|---|---|---|---|---|
| 2004/0090351 A1* | 5/2004 | Wu | ............ | H03M 7/30 341/50 |
| 2008/0152235 A1* | 6/2008 | Bashyam | ............ | G06F 17/30153 382/224 |
| 2008/0234990 A1* | 9/2008 | Bowers | ............ | G06F 19/701 703/1 |
| 2013/0018856 A1* | 1/2013 | Pedersen | ............ | H03M 7/30 707/693 |

FOREIGN PATENT DOCUMENTS

| | | |
|---|---|---|
| JP | H04340866 A | 11/1992 |
| JP | H06337762 A | 12/1994 |
| JP | H11136523 A | 5/1999 |
| JP | H011317671 A | 11/1999 |
| JP | 2004038979 A | 2/2004 |
| JP | 2008287723 A | 11/2008 |

OTHER PUBLICATIONS

Kesheng Wu, Ekow J. Otoo & Arie Shoshani, Optimizing Bitmap Indices with Efficient Compression, ACM Transactions on Database Systems, Mar. 1, 2006, pp. 1-38, vol. 31, No. 1, ACM, New York, NY, US.

Franceso Fusco, Marc PH. Stoecklin & Michail Vlachos, Net-FLi: On-the-fly Compression, Archiving and Indexing of Streaming Network Traffic, Proceedings of the 36th International Conference on Very Large Databases, Sep. 13, 2010, pp. 1382-1393, [retrieved on May 31, 2011]. Retrieved from: URL:http://www.comp.nus.edu.sg/~vldb2010/proceedings/files/papers/I01.pdf.

First Office Action in Chinese Application No. 2011800157341, dated Dec. 23, 2014.

Cheng, Lili, The Research of SoC Test Data Compression Based on Data Block Coding, Mar. 1, 2008.

* cited by examiner

METHOD AND SYSTEM FOR COMPRESSING DATA RECORDS AND FOR PROCESSING COMPRESSED DATA RECORDS

This application is a National Stage of International Application No. PCT/EP2011/000519, filed Feb. 4, 2011. This application claims priority to German Patent Application No. DE 102010006931.0 filed on Feb. 4, 2010. The disclosure of the above application is incorporated herein by reference.

TECHNICAL FIELD

This invention relates to a method for processing data collections consisting of data records, in particular in database systems. More particularly, this invention relates to the compressing of data records and the processing of compressed data. It further relates to a data structure product containing compressed data records, as well as a database computer system and a computer program.

DESCRIPTION OF THE RELATED ART

With the aid of databases, data collections can be processed, e.g. by searching them or by evaluating them by combining them with each other.

In many cases, the data collections are provided so that in the data records having a binary structure generated from the data collections, depending upon the used data, in part binary data structures are comprised which only include zero values over wide partial areas. When data collections are generated, it can happen that data which are e.g. only slightly different cannot be combined but are generated as two different data records. The amount of data records in a database is therefore frequently very high.

In order to nevertheless be able to manage the data records well, the tendency has become to decrease the size of the data records without losing information. This is carried out by a data compression, for example.

This has the advantage that the amount of data to be stored, e.g. in electronic form, is reduced to a large extent. However, in electronic processing operations such as in the combination of data, the compressed data have each to be completely decompressed and thus returned into the original state in order to be able to carry out a corresponding processing operation. As a consequence of the decompression process to be performed, the processing time is increased.

Further, the data has to be returned into the original state or decompressed before the processing, only a sequential processing of the data is possible. The reason for this is that due to the type of compression, in most cases the decompression can only be performed sequentially. For storing intermediate results in the electronic processing of the data a very large random access memory is required in which the decompressed can be kept.

EP 0 633 537 B1 discloses a method and a system for searching a compressed document while a plurality of character strings stored in the compressed document are stored in a compressed code. A query request is received, the query request is converted into the compressed code, and the converted query request is compared with the compressed codes stored in the compressed document.

SUMMARY

According to the invention, a method comprising the features of claim 1, a data storage medium or data structure product with the features of claims 15 and 16, a method to process compressed data records with the features of claim 22 and a database computer system with the features of claims 25 and 26, respectively, are proposed.

The invention proposes to divide data records with a binary structure into several bit vectors. The size of each bit vector is reduced by dividing the bit vector first into consecutive partial areas of equal size, each partial area consisting of n bits. These partial areas are then classified as trivial partial areas, quasi-trivial partial areas or as non-trivial partial areas, depending on their content structure.

One or several consecutive non-trivial partial areas of a bit vector are combined into one so named R block. The trivial partial areas are removed. One or several consecutive quasi-trivial partial areas are combined into one so named O block.

In this manner, the size of a data record can be reduced significantly.

When combining non-trivial partial areas of one bit vector into one so named R block, the absolute bit vector position $P_R$ of the first bit of the first non-trivial partial area included in the respective R block and the number $m_R$ of the consecutive non-trivial partial areas in the so named R block can be noted in the R block. This provides for a fast determination of the content of the R block and according fast data retrieval. The number $m_R$ gives the count or the quantity of consecutive non-trivial partial areas in the R block.

When combining quasi-trivial partial areas of one bit vector into one so named O block, the absolute bit vector position $P_O$ of the first bit of the first quasi-trivial partial area included in the so named O block and the number $m_O$ of the consecutive quasi-trivial partial areas in the O block can be noted on the O block. This provides for a fast determination of the content of the R block and according fast data retrieval. The number $m_O$ gives the count or the quantity of consecutive quasi-trivial partial areas in the O block.

Further, the quasi-trivial partial areas may be removed (deleted) which contributes to an additional reduction of size of the bit vector.

During the reduction as proposed by the invention, no information is lost. The reduction may be carried out by a data compression, for example, in an electronic data processing. Due to the reduction of the size of the bit vector, the amount of data to be processed is substantially reduced. In this context, the invention provides that each bit vector is reduced in size by this compression. To this end, the bit vectors are each segmented into consecutive partial areas of equal size, each partial area consisting of n bits. The partial areas may now contain bits having different values or only bits having the same value.

On this basis, the partial areas can be classified as different partial areas. Trivial partial areas and quasi-trivial partial areas can be partial areas having a regular bit structure, for example. Trivial partial areas can be defined as partial areas which contain only zeroes while quasi-trivial partial areas can be defined as partial areas which contain only ones. Non-trivial partial areas are partial areas which contain both ones and zeroes. It is to be noted that the above definition of the respective names of the partial areas is not to be understood to be limiting but only given by means of example. Of course, the partial areas in which the bits only have the value 1 could also be defined to be trivial partial areas in the context of this invention, and partial areas in which the bits only have the value 0 would be defined to be quasi-trivial partial areas, then.

Consecutive non-trivial partial areas and consecutive quasi-trivial partial areas can be combined into blocks. The non-trivial partial areas are combined into R blocks. In each R block, the position $P_R$ of the first bit of the first partial area included in each R block is noted which has the bit in the original state in the bit vector. Furthermore, the number $m_R$ of the consecutive non-trivial partial areas contained in an R block may be noted. If a quasi-trivial partial area or a trivial partial area immediately follows a non-trivial partial area, the individual non-trivial partial area is put to the R block, and the bit vector position $P_R$ and the number $m_R=1$ may be noted.

The quasi-trivial partial areas may be combined substantially "notionally" by finding consecutive quasi-trivial partial areas and noting the absolute position $P_O$ of the first bit of the first quasi-trivial partial area notionally included in each O block having the bit in the original state of the bit vector together with the number $m_O$ of the consecutive quasi-trivial partial areas in one O block. The quasi-trivial partial areas are removed so that only the information about the absolute bit vector position $P_O$ and the number $m_O$ remain included in the O block. If a trivial partial area or a non-trivial partial area immediately follows a quasi-trivial partial area, only the absolute bit vector position $P_O$ of the first bit of this quasi-trivial partial area and the number $m_O=1$ are noted.

The trivial partial areas are completely removed.

By noting the absolute position of the first bit of the first partial area included in each R block and the number $m_R$ of the consecutive non-trivial partial areas in a R block, the data included in each R block can be used without having to return the bit vector into the original state or to decompress it.

By using the absolute bit vector position $P_O$ of the quasi-trivial partial areas originally included in each O block and the number $m_O$ of the originally consecutive quasi-trivial partial areas in an O block, the O blocks include sufficient information in order to be able to use these data in the processing of data records without having to return the bit vector to the original state or to decompress it.

The fact that the absolute bit vector positions $P_O$ and $P_R$ of the O blocks or R blocks, respectively, are known, further allows the data included in these blocks to be used for a parallel data processing. Thus it is possible, for example, that upon combination of at least two bit vectors into a solution or result vector, the combination of individual O blocks and/or R blocks of the bit vectors can be carried out in parallel. This enables a particularly rapid processing of the data records. Furthermore, the consecutive information areas having n bits each inside one block of the result bit vector may also be processed in parallel.

The absolute bit vector position $P_R$ and the number $m_R$ of the consecutive non-trivial partial areas in an R block may be noted at the beginning of each R block. This may be done in a binary form. In each R block, an information area having n bits can be generated in which the absolute vector position $P_R$ and the number $m_R$ of the consecutive non-trivial partial areas in an R block are noted, e.g. in binary form. The number $m_R$ may be noted in the last x bits of the information area, with $x=\log_2 n$. This sort of labelling or designation requires a small amount of data. By providing the information area at the origin of each R block, the processing of the data included in the R block is simplified because it is already known at the start of the processing of the given R block how many data is included in the R block and where these data was originally located in the bit vector.

Due to the fact that each partial area consists of n bits and each R block always includes an integer number $m_R$ of non-trivial partial areas, the absolute bit vector position $P_R$ is always an integer multiple of n.

As a consequence, when noting the absolute bit vector position $P_R$, e.g. in a binary form, the last x bits of the information area always remain 0, provided that $x=\log_2 n$. The last x bits of the information area are thus not required for noting the absolute bit vector position $P_R$ so that the number $m_R$ of the consecutive non-trivial partial areas can be noted therein. This reduces the data amount required for the information area.

Further, exclusively the absolute bit vector position $P_O$, the number $m_O$ of the quasi-trivial partial areas originally included in an O block and an identification of the O block, e.g. in a binary form, may be noted in an O block. In this case, it can be provided that in each O block a first and second information areas each having n bits are generated in which the absolute bit vector position $P_O$ and the number $m_O$ of the quasi-trivial partial areas originally included in an O block are noted, e.g. in a binary form. The absolute bit vector position $P_O$ may be noted in the first information area and the number $m_O$ may be noted in the second information area (which of course could also be done vice-versa). The identification may further be noted in the last x bits of the first information area, with $x=\log_2 n$. For example, the identification or labelling can be based on the last x bits having the value 0.

In this manner, based on the information included in the O block concerning the absolute bit vector position $P_O$ and the number $m_O$, an O block requiring a small amount of storage capacity can be generated.

One embodiment of the invention provides that for the number $m_R$ the relation $m_R \leq n-1$ is valid. It can be further provided that for the number $m_O$ the relation $m_O \leq 2^n$ is valid. Each bit vector can have a maximum length of $2^n+n-1$.

The data records compressed or reduced as described above may be processed without having to be brought back into their original decompressed state by selecting at least two bit vectors and combining the at least two bit vectors to one solution vector, wherein the combination of the bit vectors is carried out by the combination of O blocks and/or R blocks of the bit vectors.

Due to the structure of the compressed data records, the invention allows for several combinations of O blocks and/or R blocks of the bit vectors being carried out in parallel.

Processing of data records may be performed by a computer unit including several SIMD processors (SIMD—single instruction multiple data), wherein the parallel combination is distributed to the several SIMD processors.

The invention also covers a computer program with program coding means which are suitable for carrying out a method according to the invention as described above when the computer program is run on a computer. The computer program itself as well as stored on a computer-readable medium is claimed.

Further features and embodiments of the invention will become apparent from the description and the accompanying drawings.

It will be understood that the features mentioned above and those described hereinafter can be used not only in the combination specified but also in other combinations or on their own, without departing from the scope of the present invention.

The invention is schematically illustrated in the drawings by means of an embodiment by way of example and is hereinafter explained in detail with reference to the drawings. It is understood that the description is in no way limiting on the scope of the present invention and is merely an illustration of a preferred embodiment of the invention.

DETAILED DESCRIPTION

The method according to the present invention for processing data records, in particular in database systems, can be used in the context of database systems for call data records (CDR) in accounting systems in the telecommunication sector, for example.

Data collections of telecommunication services are stored, for example, in database systems. The sets of data may comprise, for example, the telephone number, the duration of the call, the time of the call, etc. Evaluation of these data can be done by means of the database systems.

However, the data sets or records are frequently generated in such manner that only one piece of the information, such as time or duration, is valid. Even if calls are made from one connection in rapid succession to the same phone number, these are regarded as two independent calls, and two different data sets are generated. This leads to a very large number of data. In Germany, for example, the number of such data is several billions.

The collection of these data are converted into data records having a binary structure. This can occur in the form of a matrix (bitmap), for example, wherein the rows denote the respective calls and the columns denote the corresponding conditions such as time, duration etc., for example.

In such a matrix, the binary value 1 means that the corresponding information is true, and the binary value 0 means that this information is not true. Due to the nature of the data records as described above, the binary structure in the form of a matrix as shown in FIG. 1 comprises large areas including bits having the value 0, and there are also areas including a plurality of consecutive bits having the value 1.

Figure 1:
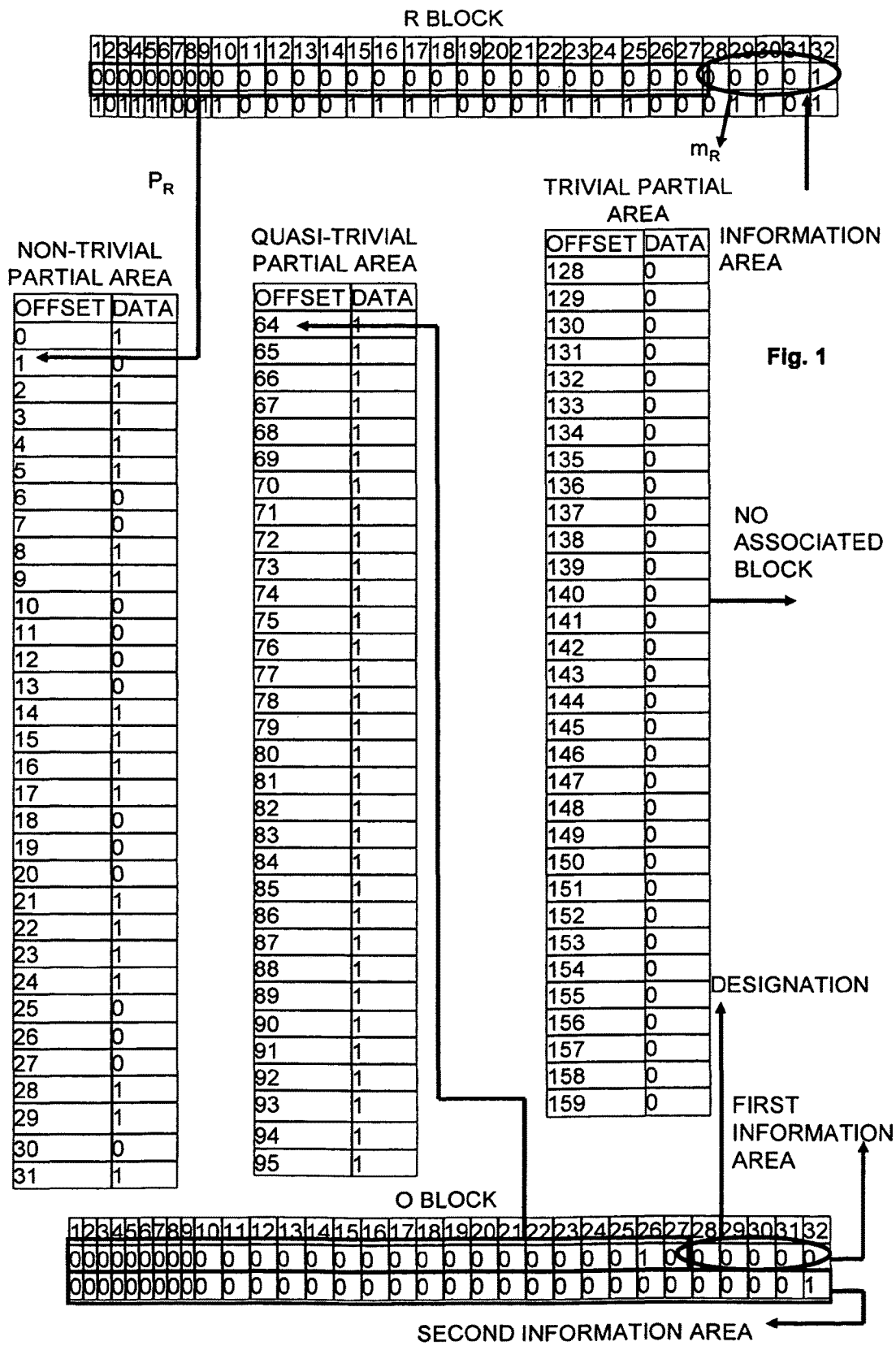
FIG. 1 is a schematic block diagram depiction illustrating the invention.

The binary structure can now be divided into several bit vectors, wherein in the depiction of FIG. 1 each column represents one bit vector.

The bit vectors can now be reduced in size without losing any information. To this end, the bit vectors are divided into consecutive partial areas having the same size. Each partial area consists of n bits. The corresponding partial areas are schematically illustrated in FIG. 1. For purposes of better depiction, only the first partial area of a bit vector, the third partial area of a bit vector and the fifth partial area of a bit vector are shown in FIG. 1. In the illustrated embodiment, the partial areas consist of 32 bits each as in many computers today the basic storage unit consists of 32 bits. More recent systems have base storage units comprising 64 bits so that it is of course also possible to provide partial areas having 64 bits.

The partial areas are classified. The partial areas which respectively include bits having the values 0 and 1 in an arbitrary sequence are—in the context of this application—so-called non-trivial partial areas. The partial areas exclusively including bits having the value 1 are so-called quasi-trivial partial areas. The partial areas exclusively including bits having the value 0 are so-called trivial partial areas.

Several consecutive non-trivial partial areas are combined into a so-called R block.

In the R block, an information area having the length of n bits is generated at the beginning of the R block. In the illustrated embodiment, the information area of the R block has the length of 32 bits. In this information area, the absolute position of the first bit of the consecutive partial areas of the original bit vector combined into this R block is noted. In the Figure, the absolute bit vector positions are designated as offset.

As in the embodiment shown in FIG. 1, the partial areas each have a length of 32 bits, the last five bits of the information area, namely the bits 28 to 32, are always invariant when the absolute bit vector position $P_R$ is noted so that they are not required for noting the absolute bit vector position $P_R$. Therefore, the bits 28 to 32 can be used for noting the number $m_R$ of the consecutive non-trivial partial areas in the R block.

In the depiction of FIG. 1, bit number 27 of the information area has the value 0 which means that the bit vector position $P_R$ is also 0. Bit 32 has the value 1 which indicates that a non-trivial partial area is included in this block. At most 31 non-trivial partial areas can be included in one R block. If there should be more than 31 consecutive non-trivial partial areas in one bit vector, they are divided into two or more different R blocks, respectively.

In the case of the bit vector having a length of 64 bits, the last 6 bits of the information area are free so that the absolute bit vector is noted starting at bit number 58. Accordingly, 63 non-trivial partial areas could be included in one R block.

For the number $m_R$ of the quantity of non-trivial partial areas included in one given R block, the relation $m_R \leq n-1$ is therefore valid.

A given R block can include only one non-trivial partial area, for example, as illustrated in the example of the Figure.

The quasi-trivial partial areas only including bits having the value 1 are also combined into blocks, designated as so-called O blocks. In doing so, these blocks are only "notionally" combined. This means that an O block in the context of this application may merely include a first information area and a second information area.

The first information area includes an identification that this block is an O block. Further, the absolute bit vector position of the first bit of the first partial area notionally included in the O block is noted. In the example of FIG. 1, the absolute bit vector position $P_O$ is 64 so that bit number 26 of the first information area has the value 1. The identification is carried out such that in the first information area the bits number 28 to 32 have the value 0. In this way, the O block can be distinguished from the R block.

In the second information area, the number $m_O$ of the quantity of quasi-trivial partial areas notionally included in the O block is noted, e.g. in binary form. In the illustrated embodiment, at most $2^{32}$ quasi-trivial partial areas can be notionally included in one O block.

In a system in which partial areas consist of 64 bits, the identification is noted in the bits number 59 to 64 of the first information area by setting these bits to 0. The number is again noted in the second information area, wherein in this case the number of the notionally consecutive quasi-trivial partial areas in one O block is theoretically at most $m_O = 2^{64}$.

The quasi-trivial partial areas are then removed.

Furthermore, the trivial partial areas in which the bit values are always 0 are also removed.

In doing so, the amount of data to be stored can be largely reduced by the described reduction or "compression" of the bit vectors. This is significant particularly in connection with data records of the nature as described above, where large amounts of data including bits having the value 0 or including bits having the value 1 are arranged consecutively.

In the further processing of the compressed data records, e.g. in connection with a data query, at least two bit vectors are selected and combined.

The selection of the bit vectors depends on the particular request. In the combination of the bit vectors, O blocks and/or R blocks of the bit vectors are combined.

To this end, it is first determined whether the two blocks to be combined have an intersection area. This intersection area is then simply combined by the corresponding operation. This can be, for example, an AND or an OR operation. The result is written into a solution vector.

The solution can be written into the solution vector in a compressed form. Of course, the solution vector can also be output in the uncompressed state. In the latter case, the empty spaces remaining in the solution vector after the combination are then filled with the values 0.

The calls satisfying the respective requests (such as a query for calls lasting longer than a given period such as one minute or one hour) can now be retrieved from the solution vector, as for these calls the bit vector is 1 at the corresponding position of the solution vector.

When combining the bit vectors, the combination of O blocks and/or R blocks of the bit vectors can be performed in parallel as in the blocks the absolute bit vector position of the partial areas included in the blocks is known. In particular, it is not required for the combination that the bit vectors are returned (brought back) into their original state, i.e. it is not required that they are decompressed.

Therefore, an enormous amount of time can be saved in the process of combinion. Furthermore, in the use of computer systems for processing the data records, the storage demand for the combination is held very low.

Figure 2:
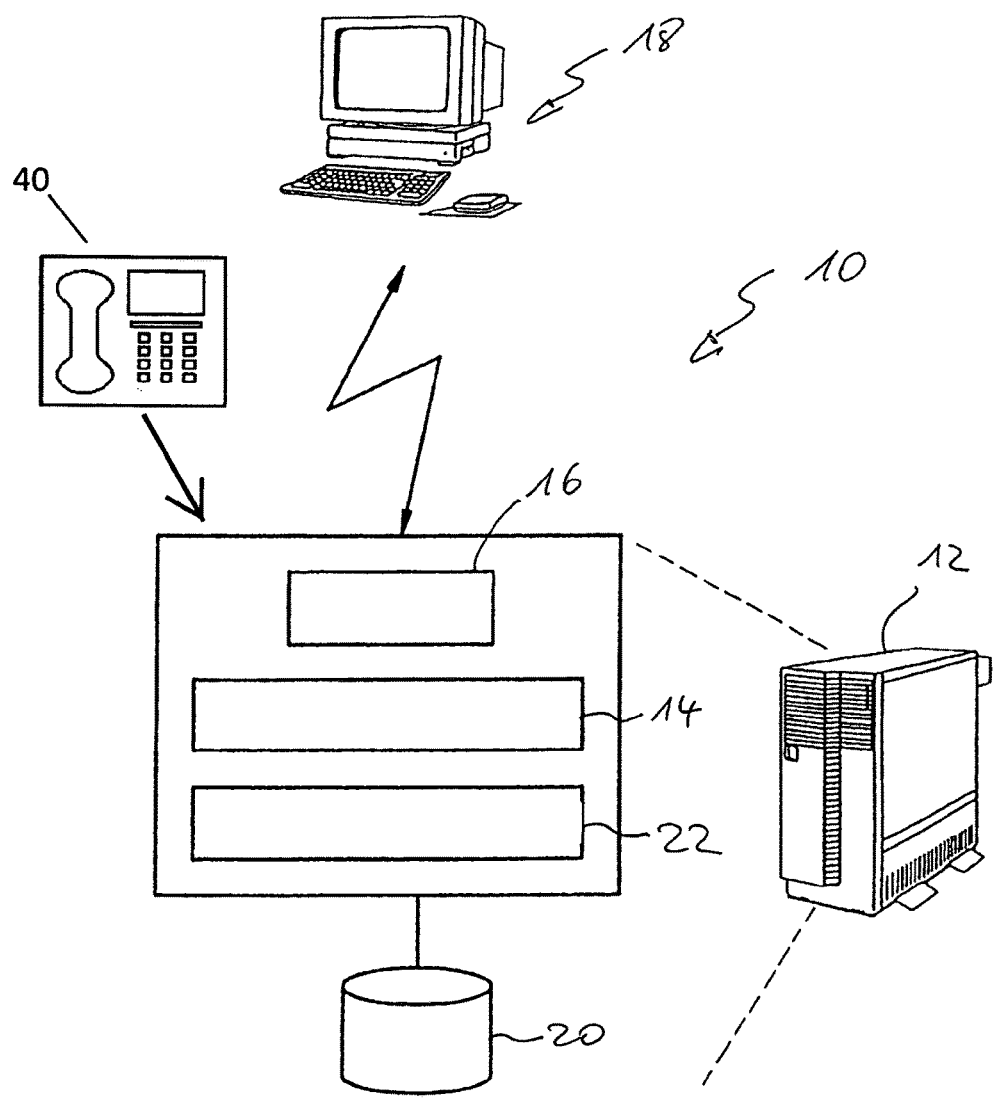
FIG. 2 is a schematic view of a computer database system upon which the invention can be implemented.

FIG. 2 illustrates in very schematical manner a computer system 10 upon which an embodiment of the present invention may be implemented. The computer system 10 comprises a computer 12 with a bus 22 for communicating data, a processing unit 14 and a database storage medium (database) 20 for storing sets of data. The computer system 10 further comprises at least one input/output device 18 which in the depiction of FIG. 1 is a client with keyboard 18.2, pointing device 18.3 for cursor control and a monitor 18.1. The at least one input/output device 18 can be connected with the computer within an intranet network, for example.

Figure 3:
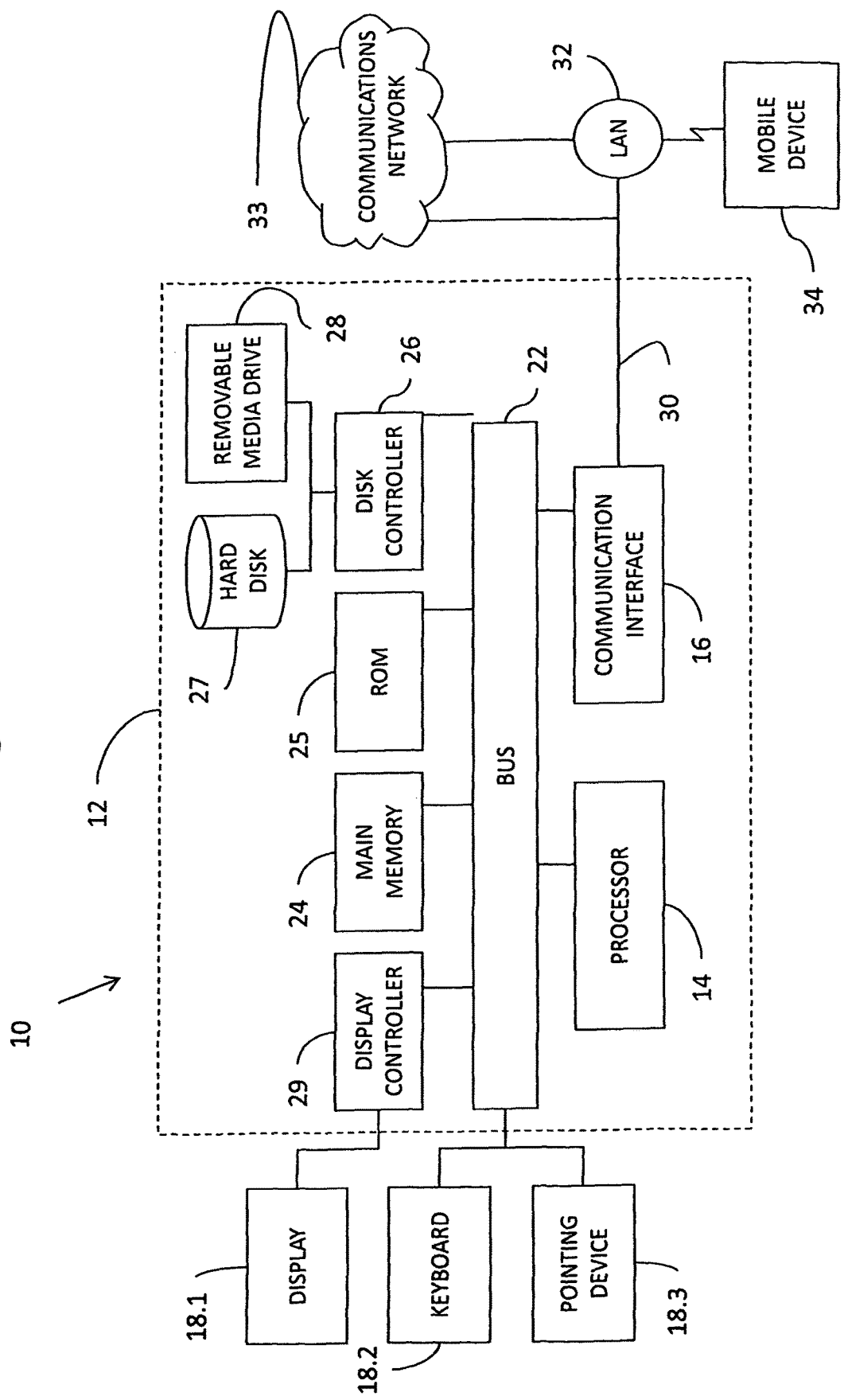
FIG. 3 is a more detailed block diagram of the computer system of FIG. 2.

FIG. 3 illustrates the computer system 10 of FIG. 1 in more detail. The computer system 10 includes a bus 22 or other communication mechanism for communicating information, and a processor 14 coupled with the bus 22 for processing the information. The computer system 10 also includes a main memory 24, such as a random access memory (RAM) or other dynamic storage device (e.g., dynamic RAM (DRAM), static RAM (SRAM), and synchronous DRAM (SDRAM)), coupled to the bus 22 for storing information and instructions to be executed by processor 14.

In addition, the main memory 24 may be used for storing temporary variables or other intermediate information during the execution of instructions by the processor 14. The computer system 10 further includes a read only memory (ROM) 25 or other static storage device (e.g., programmable ROM (PROM), erasable PROM (EPROM), and electrically erasable PROM (EEPROM)) coupled to the bus 22 for storing static information and instructions for the processor 14.

The computer system 10 also includes a disk controller 26 coupled to the bus 22 to control one or more storage devices for storing information and instructions, such as a magnetic hard disk 27, and a removable media drive 28 (e.g., floppy disk drive, read-only compact disc drive, read/write compact disc drive, compact disc jukebox, tape drive, and removable magneto-optical drive). The storage devices may be added to the computer system 10 using an appropriate device interface (e.g., small computer system interface (SCSI), integrated device electronics (IDE), enhanced-IDE (E-IDE), direct memory access (DMA), or ultra-DMA)).

The computer system 10 may also include a display controller 29 coupled to the bus 22 to control a display or monitor 18.1, such as a cathode ray tube (CRT) or liquid crystal display (LCD) or the like, for displaying information to a computer user. The computer system includes input devices, such as keyboard 18.2 and pointing device 18.3, for interacting with a computer user and providing information to the processor 14. The pointing device 18.3, for example, may be a mouse, a trackball, or a pointing stick for communicating direction information and command selections to the processor 14 and for controlling cursor movement on the display 18.1. In addition, a printer may provide printed listings of data stored and/or generated by the computer system 10.

The computer system 10 performs a portion or all of the processing steps of the invention in response to the processor 14 executing one or more sequences of one or more instructions contained in a memory, such as the main memory 24. Such instructions may be read into the main memory 24 from another computer readable medium, such as a hard disk 27 or a removable media drive 28. One or more processors in a multiprocessing arrangement may also be employed to execute the sequences of instructions contained in main memory 24. In alternative embodiments, hard-wired circuitry may be used in place of or in combination with software instructions. Thus, embodiments are not limited to any specific combination of hardware circuitry and software.

Telephone call data from a telephone 40 are collected through a data link connection (which might be wireless) in the computer system. The collected data becomes part of the data collection built up in the data storage medium 20 according to the invention.

As stated above, the computer system 10 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 10, for driving a device or devices for implementing the invention, and for enabling the computer system 10 to interact with a human user, such as an operator. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 14 for execution. A computer readable medium may take many forms, including but not limited to, non-volatile media, volatile media, and transmission media. Non-volatile media includes, for example, optical, magnetic disks, and magneto-optical disks, such as the hard disk 27 or the removable media drive 28. Volatile media includes dynamic memory, such as the main memory 24. Transmission media includes coaxial cables, copper wire and fiber optics, including the wires that make up the bus 22. Transmission media also may also take the form of acoustic or light waves, such as those generated during radio wave and infrared data communications.

The computer system 10 also includes a communication interface 16 coupled to the bus 22. The communication interface 16 provides a two-way data communication coupling to a network link 30 that is connected to, for example, a local area network (LAN) 32, or to another communications network 33 such as the Internet. For example, the communication interface 16 may be a network interface card to attach to any packet switched LAN. As another example, the communication interface 16 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 40 sends and receives electrical, electromagnetic or optical signals that carry digital data streams representing various types of information.

The network link 30 typically provides data communication through one or more networks to other data devices. For example, the network link 30 may provide a connection to another computer through a local network 32 (e.g., a LAN) or through equipment operated by a service provider, which provides communication services through a communications network 33. The local network 30 and the communications network 33 use, for example, electrical, electromagnetic, or optical signals that carry digital data streams, and the associated physical layer (e.g., CAT 5 cable, coaxial cable, optical fiber, etc). Moreover, the network link 30 may provide a connection through a LAN 32 to a mobile device 34 such as a personal digital assistant (PDA) laptop computer, or cellular telephone.

Figure 4:
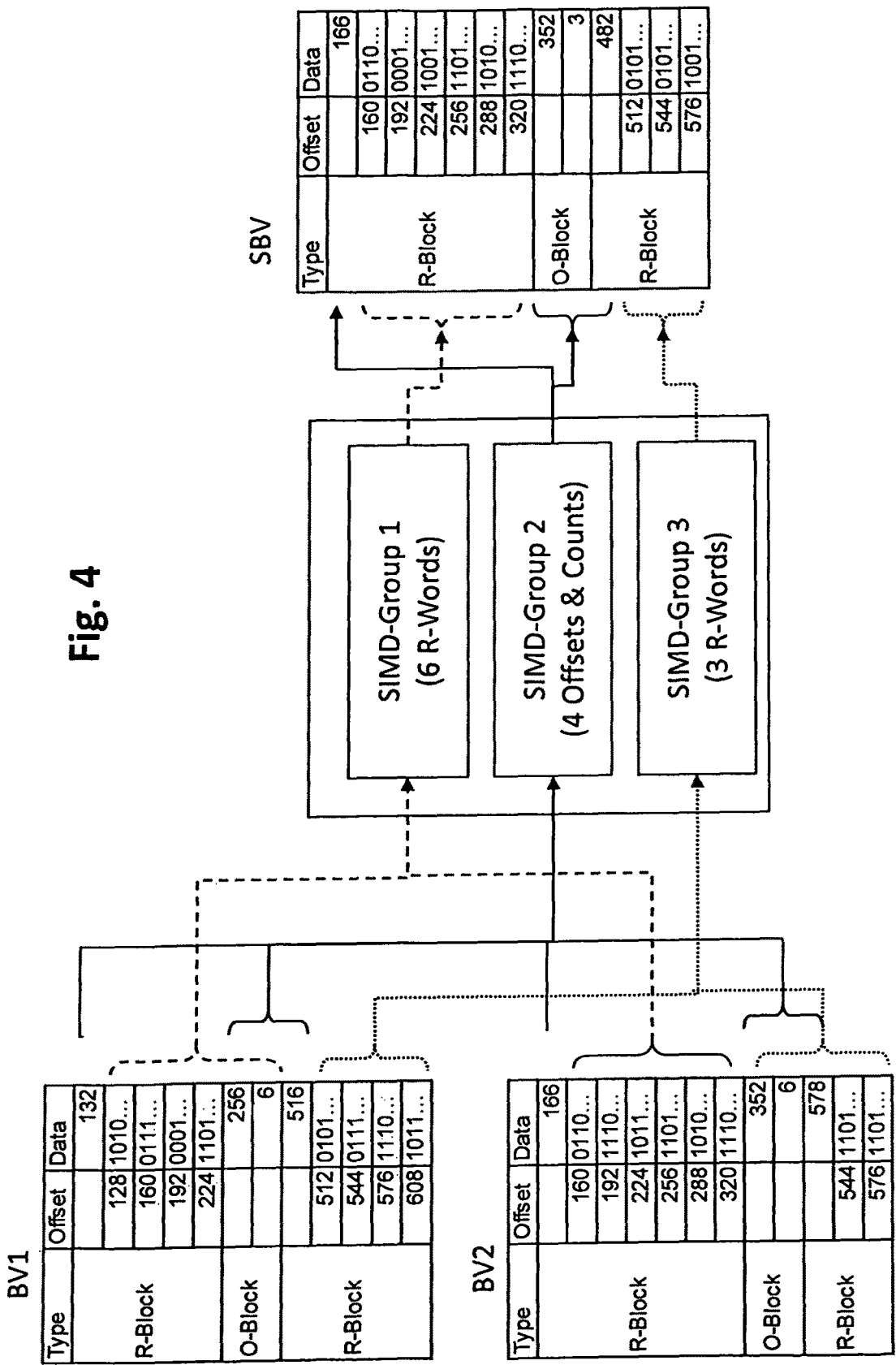
FIG. 4 is an illustration of a parallel processing on SIMD processors according to the invention.

According to the invention, it is provided that the combination operations can be executed in parallel on several SIMD (single instruction multiple data) processors which is illustrated in the depiction of FIG. 4.

FIG. 4 shows on the left side (for a viewer of the depiction) two bit vectors BV1 and BV2. Each of these bit vectors BV1 and BV2 comprise a number of R blocks and O blocks, each of these blocks again consisting of the absolute bit vector position $P_R$ or $P_O$, respectively, and according numbers $m_R$ and $m_O$, respectively. The R blocks also contain the data bit sequences (right hand column in the depiction of the bit vectors in FIG. 4). The O blocks only contain the absolute bit vector positions and the numbers reflecting the amount/quantity of consecutive quasi-trivial partial areas. According to the invention, the quasi-trivial partial areas themselves were deleted.

Processing the bit vectors is done by combining them into a solution or result vector SBV. This may be done by a plurality of processors in parallel, as shown in exemplary manner in FIG. 4. FIG. 4 illustrates an example with three processors performing an AND operation with the two depicted bite vectors BV1 and BV2; however any suitable number of available processors can be used.

In the embodiment illustrated in FIG. 4, SIMD processors available on graphics cards are used for processing the bit vectors. In this case, it can be provided, for example, that several graphics cards are included in one computer unit.

SIMD processors are sufficient for the required combination tasks. In addition, they are available in large numbers in normal computer systems. For example, a graphics chip of a powerful graphics card comprises 256 SIMD processors. As a consequence, a large number of combination operations can simultaneously be executed so that the data processing can be carried out very rapidly.

The combination of the bit vectors is carried out by combining O blocks and/or R blocks of the bit vectors.

Of course, the method according to the invention can also be applied in data records different from telecommunications data. The method according to the invention is particularly powerful in the case of data records of the type having a binary structure in which a large number of bit values 0 or of bit values 1 are arranged in consecutive order.

In the following, various aspects of the invention are recited in a numbered list.

1. A method for processing data collections, in particular in database systems, comprising the following steps:
   generating data collections;
   arranging the data collections with a binary structure;
   dividing the data records into several bit vectors;
   reducing the size of each bit vector, comprising the following sub-steps:
   dividing the bit vector into consecutive partial areas of equal size, each partial area consisting of n bits;
   classifying the partial areas as trivial partial areas, quasi-trivial partial areas and non-trivial partial areas;
   combining one non-trivial or several consecutive non-trivial partial areas to a respective R block, respectively, and noting the absolute bit vector position $P_R$ of the first bit of the first non-trivial partial area included in each R block and the number $m_R$ of the consecutive non-trivial partial areas comprised in one R block;
   removing the trivial partial areas;
   combining one quasi-trivial or several consecutive quasi-trivial partial areas to a O block, respectively, noting the absolute bit vector position $P_O$ of the first bit of the first quasi-trivial partial area included in each O block and the number $m_O$ of the consecutive quasi-trivial partial areas comprised in one O block, and removing the quasi-trivial partial areas;
   selecting at least two bit vectors and combining the at least two bit vectors to one solution vector, wherein the combination of the bit vectors is carried out by the combination of O blocks and/or R blocks of the bit vectors.

2. The method according to aspect 1, wherein in the combination of the at least two bit vectors several combinions of O blocks and/or R blocks of the bit vectors are carried out in parallel.

3. The method according to aspect 1 or 2, wherein the absolute bit vector position $P_R$ and the number $m_R$ of the consecutive non-trivial partial areas in one R block are noted at the origin of each R block having non-trivial partial areas, preferably in a binary form.

4. The method according to one of aspects 1 to 3, wherein exclusively the absolute bit vector position $P_O$, the number $m_O$ of the quasi-trivial partial areas originally included in one O block and an identification of the O block are noted in an O block, preferably in a binary form.

5. The method according to one of aspects 1 to 4, wherein for the number $m_R$ the relation $m_R \leq n-1$ is valid.

6. The method according to one of aspects 1 to 5, wherein for the number $m_O$ the relation $m_O \leq 2^n$ is valid.

7. The method according to any one of aspects 1 to 6, wherein each bit vector has a maximum length of $2^n + n - 1$.

8. The method according to any one of aspects 3 to 7, wherein in each R block an information area having n bits is generated, in which information area the absolute bit vector position $P_R$ and the number $m_R$ of the consecutive non-trivial partial areas in one R block are noted in binary form, wherein the number $m_R$ is noted in the last x bits of the information area, and $x = \log_2 n$.

9. The method according to any one of aspects 4 to 7, wherein in each O block a first and a second information area each having n bits are generated in which the absolute bit vector position $P_O$ and the number $m_O$ of the quasi-trivial partial areas originally included in an O block are noted in a binary form, wherein the absolute bit vector position $P_O$ is noted in the first information area and the number $m_O$ is noted in the second information area, and wherein the identification is noted in the last x bits of the first information area, and $x = \log_2 n$.

10. The method according to any one of aspects 2 to 10, wherein the parallel combination is carried out on a computer unit having several SIMD processors.

The invention claimed is:

1. A method for compressing data records in a database system, the method comprising the following steps:
providing data records to a database system with a binary structure;
dividing the data records in said database system into several bit vectors;
reducing the size of each bit vector in said database system by dividing the bit vector into consecutive partial areas of equal size, each said partial consecutive area consisting of n bits;
classifying the partial areas in said database system as trivial partial areas, quasi-trivial partial areas and non-trivial partial areas;
combining several consecutive non-trivial partial areas into one respective R block by noting an absolute bit vector position $P_R$ of a first bit of each non-trivial partial area of the several consecutive non-trivial partial areas included in the respective R block, and noting a number $m_R$ of the several consecutive non-trivial partial areas in the respective R block, wherein for the number $m_R$ the relation $m_R \leq -1$ is valid;
removing the trivial partial areas; and
combining a first quasi-trivial partial area or several consecutive quasi-trivial partial areas into one respective O block in said database system.

2. The method of claim 1, wherein the step of combining the first quasi-trivial partial area or the several consecutive quasi-trivial partial areas to one respective O block further comprises the steps noting the absolute bit vector position $P_o$ of the first bit of the first quasi-trivial partial area included in each O block and the number $m_o$ of the consecutive quasi-trivial partial areas in one O block.

3. The method of claim 2, further comprising the step of removing the quasi-trivial partial areas.

4. The method of claim 2, wherein in an O block exclusively the absolute bit vector position $P_o$, the number $m_o$ of the quasi-trivial partial areas originally included in one O block and an identification of the O block are noted.

5. The method of claim 2, wherein for the number $m_o$ the relation $m_o \leq 2^n$ is valid.

6. The method of claim 4, further comprising the step of generating, in each O block, first and second information areas each having n bits, in which first and second information areas the absolute bit vector position $P_o$ and the number $m_o$ of the quasi-trivial partial areas originally included in an O block are noted.

7. The method of claim 6, wherein the absolute bit vector position $P_o$ is noted in the first information area and the number $m_o$ is noted in the second information area.

8. The method of claim 6, wherein the identification is noted in the last x bits of the first information area, with $x = \log_2 n$.

9. The method of claim 1, wherein the absolute bit vector position $P_R$ and the number $m_R$ of the consecutive non-trivial partial areas in one R block are noted at the beginning of each R block.

10. The method of claim 9, further comprising the step of generating, in each R block, an information area having n bits, in which information area the absolute bit vector position $P_R$ and the number $m_R$ of the consecutive non-trivial partial areas in one R block are noted.

11. The method of claim 10, wherein the number $m_R$ is noted in the last x bits of the information area, with $x = \log_2 n$.

12. The method of claim 1, characterized in that each bit vector has a maximum length of $2^n + n - 1$.

13. The method of claim 1 further comprising providing a data storage medium for storing data collections on said database system and having a set of data records compressed according to the method of claim 1.

14. The method of claim 1, further comprising the step of selecting at least two bit vectors of said several bit vectors and combining the at least two bit vectors to one solution vector, wherein the combination of the at least two bit vectors is carried out by the combination of two selected from the group comprising said O blocks and said R blocks and combinations thereof.

15. The method of claim 14, wherein in the combination of the at least two bit vectors, several combinations of O blocks and R blocks of the bit vectors are carried out in parallel.

16. The method of claim 15, wherein the parallel combination is carried out on a computer unit having several SIMD processors.

17. The method of claim 16 further comprising the step of providing said database system with a computer having a bus for communicating data, a processing unit, a data storage medium for storing sets of data, wherein the computer is set up in such a manner to process compressed data records in the database system.

18. The method of claim 1 further comprising the step of: providing said database system with a computer having a bus for communicating data, a processing unit, a data storage medium for storing sets of data, wherein the computer is set up in such a manner to compress data records in the database system, and to store the compressed data records in the data storage medium.

19. A data storage medium for storing data collections and compressing data records in a database system comprising a data collection stored thereon, the data collection consisting of a set of data records with each of the data records being reduced to one of at least one R block and at least one O block;

the at least one R block has several consecutive non-trivial partial areas of the respective data record, each of said several consecutive non-trivial partial areas consisting of n bits, each R block of the at least one R block comprising an absolute bit vector position $P_R$ of a first bit of a first non-trivial partial area included in the respective R block and a number $m_R$ of the consecutive non-trivial partial areas in the respective R block, wherein for the number $m_R$ the relation $m_R \leq n-1$ is valid, and the O block has a first quasi-trivial partial area or several consecutive quasi-trivial partial areas of the respective data record.

20. The data storage medium of claim 19, wherein an O block comprises an absolute bit vector position $P_o$ of a first bit of the first quasi-trivial partial area included in the respective O block and a number $m_o$ of the consecutive quasi-trivial partial areas in the O block.

21. The data storage medium of claim 20, wherein the O block comprises exclusively the absolute bit vector position $P_o$, the number $m_o$ of the quasi-trivial partial areas originally included in the O block and an identification of the O block.

22. The data storage medium of claim 19, further comprising a computer program having program code means for performing a method when said program is executed on a database computer system.

23. The data storage medium of claim 22, further comprising a computer program product having a computer readable medium on which the computer program is stored.

* * * * *